(12) United States Patent
Mori

(10) Patent No.: US 6,330,446 B1
(45) Date of Patent: Dec. 11, 2001

(54) VELOCITY-BASED METHOD OF CONTROLLING REGISTRATION IN MOBILE COMMUNICATION SYSTEMS

(75) Inventor: Takuya Mori, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/288,105

(22) Filed: Apr. 8, 1999

(30) Foreign Application Priority Data

Apr. 8, 1998 (JP) .................................. 10-095751

(51) Int. Cl.⁷ ..................................................... H04Q 7/20
(52) U.S. Cl. ............................................. 455/435; 455/432
(58) Field of Search .................................... 455/435, 422, 455/436, 437, 440, 441, 442, 456, 455, 433

(56) References Cited

U.S. PATENT DOCUMENTS

| | | | | |
|---|---|---|---|---|
| 5,095,531 | * | 3/1992 | Ito ......................................... | 455/435 |
| 5,140,695 | * | 8/1992 | Yasuda et al. ........................ | 455/450 |
| 5,379,451 | * | 1/1995 | Nakagoshi et al. .................. | 455/435 |
| 5,396,645 | * | 3/1995 | Huff ...................................... | 455/441 |
| 5,585,805 | * | 12/1996 | Takenaka et al. .................... | 342/461 |
| 5,588,043 | * | 12/1996 | Tiedemann, Jr. et al. ........... | 455/435 |
| 5,649,286 | * | 7/1997 | Frerking ............................... | 455/435 |
| 5,787,348 | * | 7/1998 | Willey et al. ......................... | 455/441 |
| 5,983,104 | * | 11/1999 | Wickman et al. .................... | 455/441 |
| 5,990,676 | * | 11/1999 | Hori ....................................... | 324/175 |
| 6,061,564 | * | 5/2000 | Akeda .................................... | 455/435 |

FOREIGN PATENT DOCUMENTS

| | | | | |
|---|---|---|---|---|
| 404065996 | * | 3/1992 | (JP) ................................. | H04Q/7/04 |
| 406319168 | * | 11/1994 | (JP) ................................. | H04Q/7/04 |
| 408051660 | * | 2/1996 | (JP) ................................. | H04Q/7/34 |
| 410210143 | * | 8/1998 | (JP) . | |
| 411252628 | * | 9/1999 | (JP) . | |
| 20000050358 | * | 2/2000 | (JP) ................................. | H04Q/7/38 |

* cited by examiner

*Primary Examiner*—Vivian Chang
*Assistant Examiner*—Charles N. Appiah
(74) *Attorney, Agent, or Firm*—Venable; Michael A. Sartori; Jeffrey W. Gluck

(57) ABSTRACT

In a mobile communication system in which mobile terminals register their locations at specified intervals of time, the velocities of the mobile terminals are determined, and the registration intervals are adjusted according to the velocities. Longer intervals are assigned for lower velocities, thereby conserving battery power and system resources. Methods of determining velocity include the use of positional information provided by base stations, and the sensing of Doppler frequency shifts.

9 Claims, 10 Drawing Sheets

VELOCITY-BASED METHOD OF CONTROLLING REGISTRATION IN MOBILE COMMUNICATION SYSTEMS

BACKGROUND OF THE INVENTION

The present invention relates to a power-saving method of controlling registration in mobile communication systems such as, for example, code division multiple access (CDMA) cellular telephone systems.

The mobile terminals in a mobile communication system register their location with the system from time to time, so that the system can page them quickly when the need arises. For CDMA cellular telephone systems, Interim Standard IS-95 of the Telecommunication Industries Association specifies, among other forms of registration control, a timer-based scheme in which an idle mobile terminal sends a registration message to the system at regular intervals, which are designated by the system. The registration message contains information that the system can analyze to determine the location of the mobile terminal. The system stores the mobile terminal's location in a data base, which is updated as new registration messages arrive.

A problem with this registration control scheme is that while standing by to receive calls, a mobile terminal continues to send registration messages at the designated regular intervals, even if the mobile terminal is not actually moving. Since the registration messages are transmitted at comparatively high power, much power is dissipated in this way, causing unnecessary battery drain and shortening the time the mobile can continue operating in standby. System resources are also consumed in unnecessary data-base updates.

This problem is not limited to CDMA cellular telephone systems; it can occur in any type of mobile communication system that performs timer-based location registration.

SUMMARY OF THE INVENTION

It is accordingly an object of the present invention to reduce the power dissipated by mobile terminals in performing location registration in a mobile communication system.

A further object is to reduce the usage of system resources in location registration updates.

The invented method of registration control in a mobile communication system comprises the steps of:

determining the velocity of a mobile terminal; and adjusting the registration interval of the mobile terminal according to its velocity.

These steps can be performed by the system, by the mobile terminal, or by both. For example, the mobile terminal can determine its own velocity, and the system can adjust the registration interval in response to a request sent by the mobile terminal when the registration interval is inappropriate for the velocity.

The velocity of a mobile terminal can be determined in various ways: for example, from positional information provided by the base stations within range of the mobile terminal, or by sensing the Doppler shift in a carrier signal frequency.

The invention also provides a mobile terminal, a location registration apparatus, and a mobile communication system employing the invented method of registration control.

DETAILED DESCRIPTION OF THE INVENTION

Figure 1:
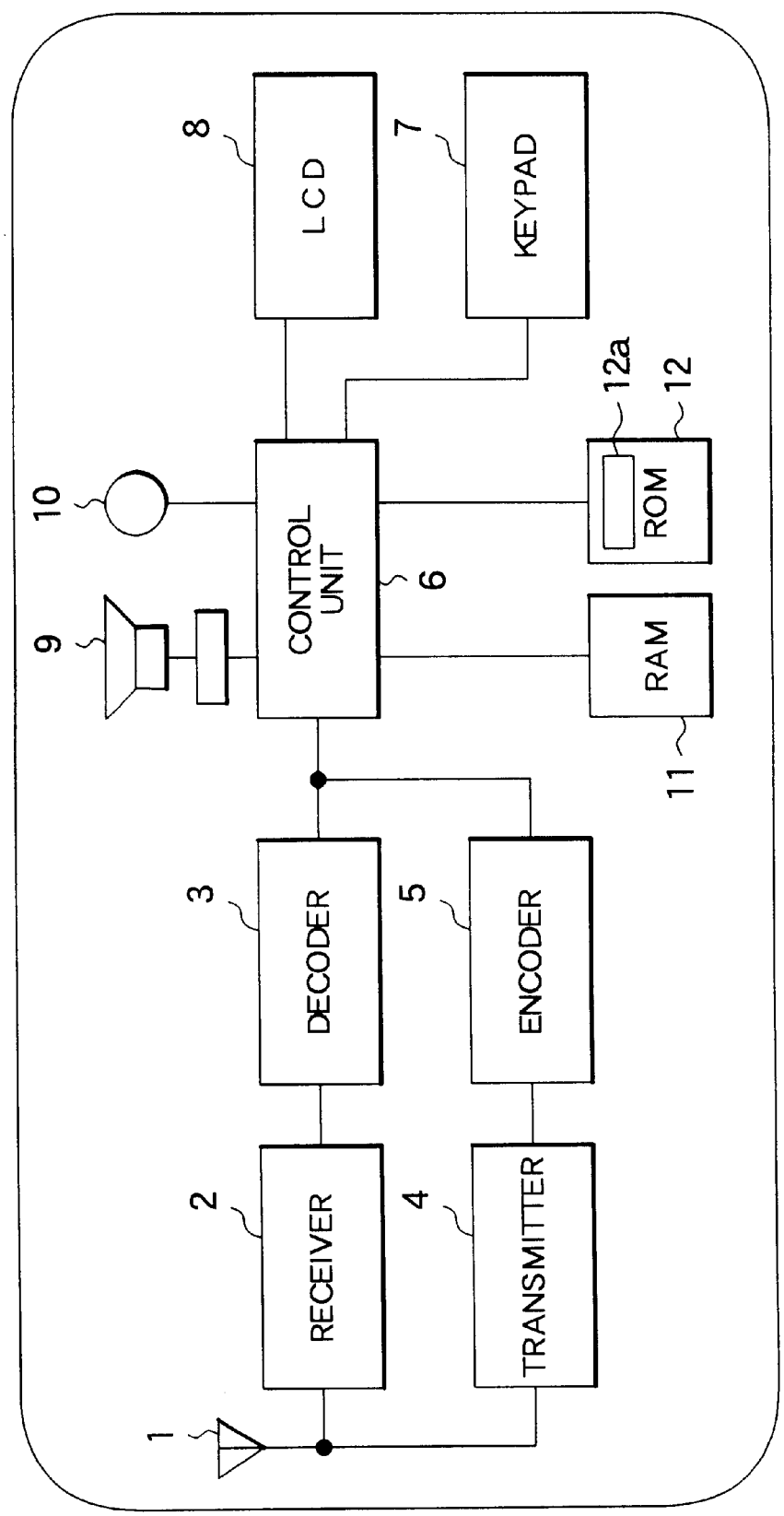
FIG. 1 is a block diagram of a mobile terminal.

Embodiments of the invention will be described with reference to the attached drawings, in which like parts are identified by like reference characters.

The invention will be exemplified within the context of a CDMA cellular telephone system comprising a plurality of base stations and a plurality of mobile terminals. Each base station serves a cell in the service area of the system, by communicating with mobile terminals located within the cell. The base stations are linked through one or more switching stations, each switching station communicating with a plurality of base stations. At least one switching station has a location registration apparatus that analyzes and registers the present locations of the mobile terminals on the basis of their registration messages.

In a first embodiment, each mobile terminal sends registration messages at intervals assigned by the location registration apparatus. In addition, each mobile terminal determines its own location, calculates its velocity as the rate of change in its location, decides whether the assigned registration interval is appropriate for the calculated velocity, and if the interval is not appropriate, sends the location registration apparatus a message requesting an adjustment of the registration interval. The location registration apparatus makes the requested adjustment.

Figure 2:
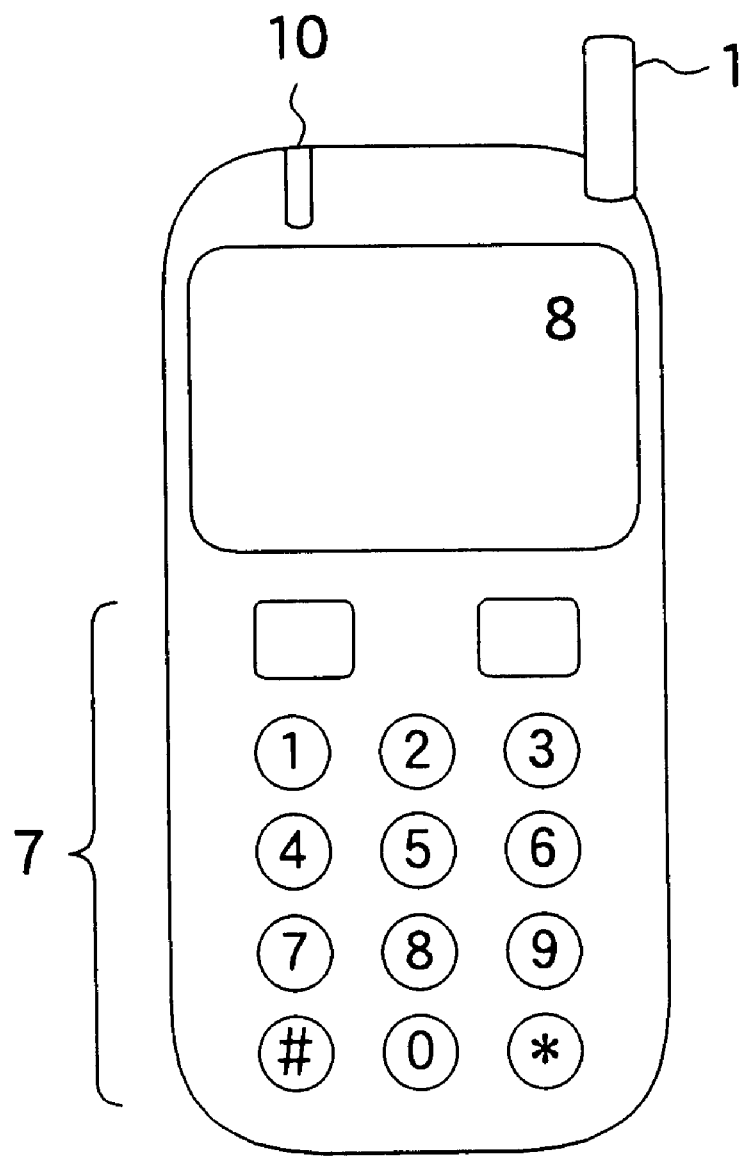
FIG. 2 shows the external appearance of the mobile terminal in FIG. 1.

Referring to FIG. 1, a mobile terminal in the mobile communication system comprises an antenna 1, a receiver 2, a decoder 3, a transmitter 4, an encoder 5, a control unit 6, a keypad 7, a liquid crystal display or LCD 8, a loudspeaker 9, a light-emitting diode or LED 10, a random-access memory or RAM 11, and a read-only memory or ROM 12, interconnected as shown. FIG. 2 shows the external appearance of the mobile terminal, indicating the antenna 1, keypad 7, LCD 8, and LED 10. Additional components, such as a microphone and batteries, have been omitted to simplify the drawings.

Briefly, the mobile terminal operates as follows. In the forward or receiving direction, a radio signal transmitted from a base station is received at the antenna 1, amplified and demodulated by the receiver 2, decoded by the decoder 3, and supplied to the control unit 6. In the reverse or transmitting direction, the encoder 5 encodes transmit data supplied by the control unit 6, and the transmitter 4 modulates the coded data onto a carrier signal, which is transmitted from the antenna 1 to the base station. The keypad 7 is used for entering telephone numbers and other information, while the LCD 8 and LED 10 display telephone numbers and various status information.

The control unit 6 controls the mobile terminal by executing program modules stored in the ROM 12, using the RAM 11 for additional data storage as necessary. The stored programs process data received from the decoder 3 and keypad 7, provide data to the encoder 5, and control the LCD 8, loudspeaker 9, and LED 10. One of these program modules is a location registration module 12=a.

Figure 3:
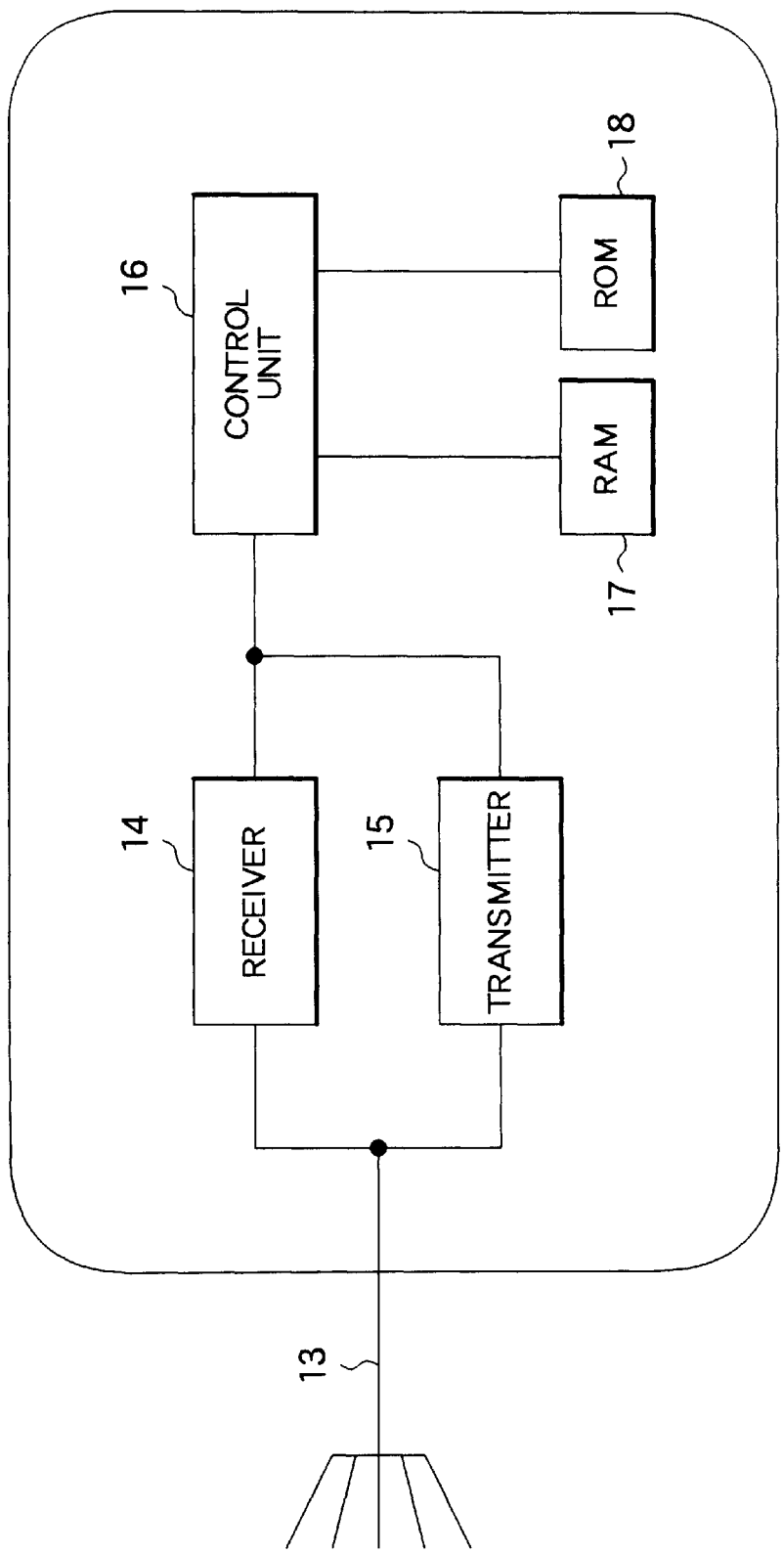
FIG. 3 is a block diagram of a location registration apparatus.

FIG. 3 is a block diagram of the location registration apparatus. The location registration apparatus is linked by communication lines 13 to a plurality of base stations. The communication lines may be physical lines, as shown, or may comprise radiotelecommunication links with associated antennas, coders, and decoders. The location registration apparatus comprises a receiver 14, a transmitter 15, a control unit 16, a RAM 17, and a ROM 18, interconnected as shown.

Information arriving from the base stations over the communication lines 13 is received by the receiver 14 and supplied to the control unit 16. Information output from the control unit 16 is sent by the transmitter 15 to a designated base station over one of the communication lines 13. The control unit 16 executes programs stored in the ROM 18 to process information from the receiver 14, using the RAM 17 for data storage as required, and providing resulting information to the transmitter 15. Thus the control unit 16 controls the location registration apparatus according to the programs stored in the ROM 18.

A block diagram of a base station will be omitted. A base station operates as a relay station between the system and the mobile terminals, communicating with the mobile terminals on a plurality of wireless channels distinguished by different spreading codes. The channels used for location registration include access channels and paging channels. The information transmitted on a paging channel includes the exact latitude and longitude of the base station. Each base station also transmits a pilot signal on a pilot channel, and synchronization information on a synchronization channel.

Next, registration operations in the first embodiment of the invention will be described.

Figure 4:
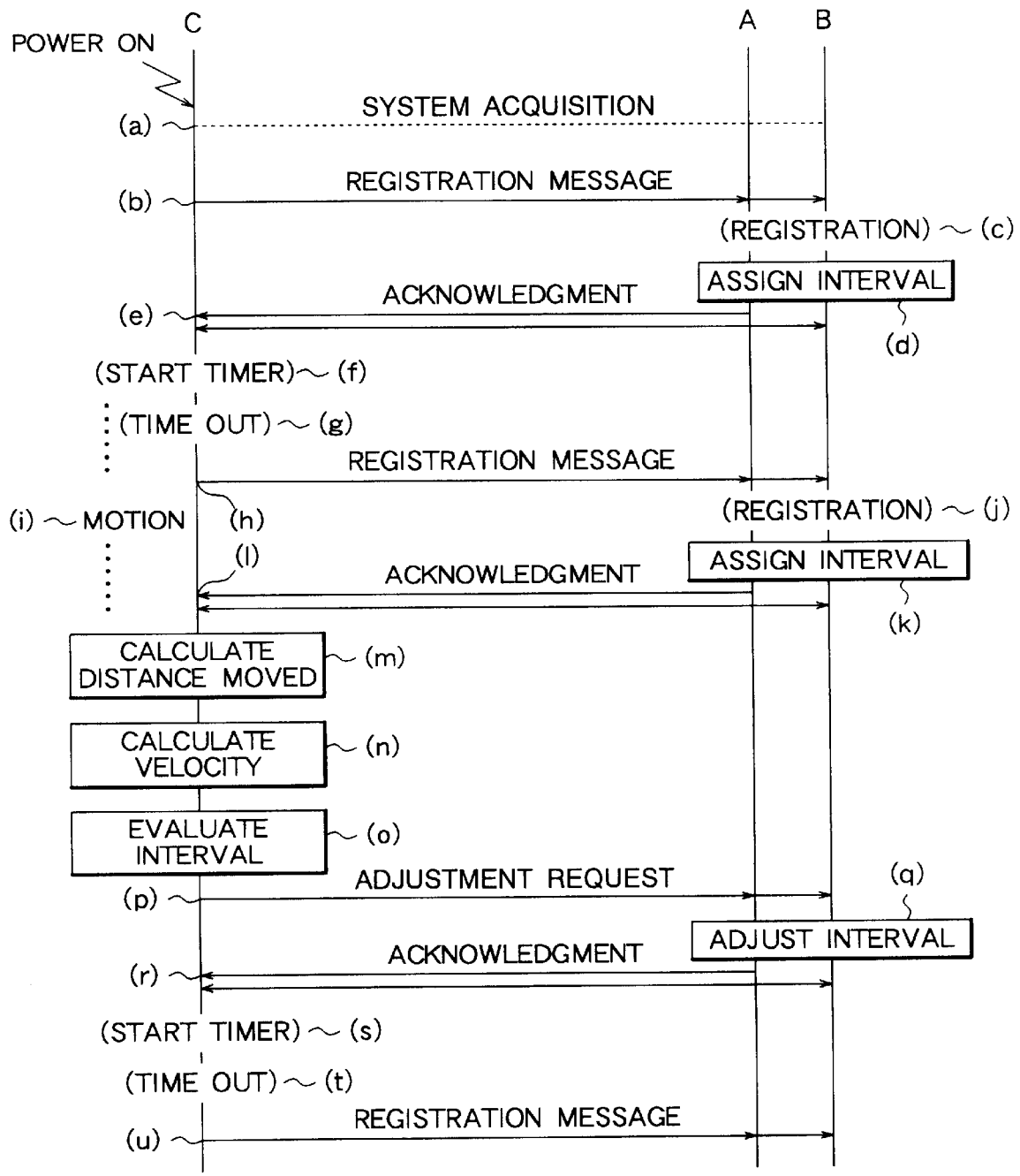
FIG. 4 is a sequence diagram illustrating the registration control procedure in a first embodiment of the invention.

FIG. 4 illustrates the location registration procedure for one mobile terminal C that is within range of two base stations A and B. A similar procedure is followed when any number of mobile terminals are within range of any number of base stations. Processing particularly related to the present invention is indicated in boxes.

When the power of the mobile terminal C is switched on, the mobile terminal first attempts to receive pilot and synchronization signals transmitted from the base stations, a process referred to as system acquisition (step a). As part of this process, the mobile terminal measures the strength of the pilot signals. Following system acquisition, the mobile terminal sends a power-up registration message to either of the base stations on an access channel (step b). The power-up registration message includes a report of the measured power of the pilot signals. The base station that receives the registration message passes it to the location registration apparatus, which analyzes the reported pilot strengths to determine the location of the mobile terminal C, and registers the location of mobile terminal C in a data base in the RAM 17 (step c). The location registration apparatus also assigns a registration interval to mobile terminal C (step d), and decides which base station is best able to communicate with mobile terminal C. In the present example, base station A is selected as this base station; mobile terminal C is considered to reside in the cell of base station A. The system then uses base station A to send mobile terminal C an acknowledgment message specifying the assigned registration interval, and giving the latitude and longitude of base station A (step e). The same information is also provided to base station B, which is a candidate for becoming the next base station to communicate with mobile terminal C if mobile terminal C moves out of the cell of base station A.

The control unit 6 in mobile terminal C includes a timer for measuring the assigned registration interval. This timer is started when mobile terminal C receives the acknowledgment message (step f). When the timer times out (step g), mobile terminal C sends another registration message to base station A or, if the mobile terminal C cannot communicate with base station A, to base station B (step h). Between this registration message and the power-up registration message, mobile terminal C may have moved (step i). The location registration apparatus analyzes the new registration message to determine the new location of mobile terminal C, registers the new location (step j), and selects a new registration interval (step k). Mobile terminal C is informed of the new interval assignment in a new acknowledgment message (step l).

From the latitude and longitude information received together with the acknowledgment messages in steps e and l, the mobile terminal C determines how far it has moved between the two interval assignments (step m). Dividing this distance by the time between the two interval assignments, mobile terminal C calculates its velocity (step n), and decides whether the assigned registration interval is appropriate for the calculated velocity (step o). If the assigned registration interval is inappropriate, mobile terminal C sends a request for an adjustment of the registration interval (step p).

Upon receiving this request, the location registration apparatus selects a new registration interval (step q) and returns another acknowledgment message notifying the mobile terminal C of the new registration interval (step r). The mobile terminal C sets its timer to the new registration interval, and starts the timer (step s). When the timer times out (step t), the mobile terminal C sends another registration message (step u).

Registration continues in this way at the intervals designated by the location registration apparatus, the mobile terminal C continuing to determine its own velocity and request that the registration interval be changed when necessary.

Next, steps d, k, m, n, o, and q will be described in more detail.

Figure 5:
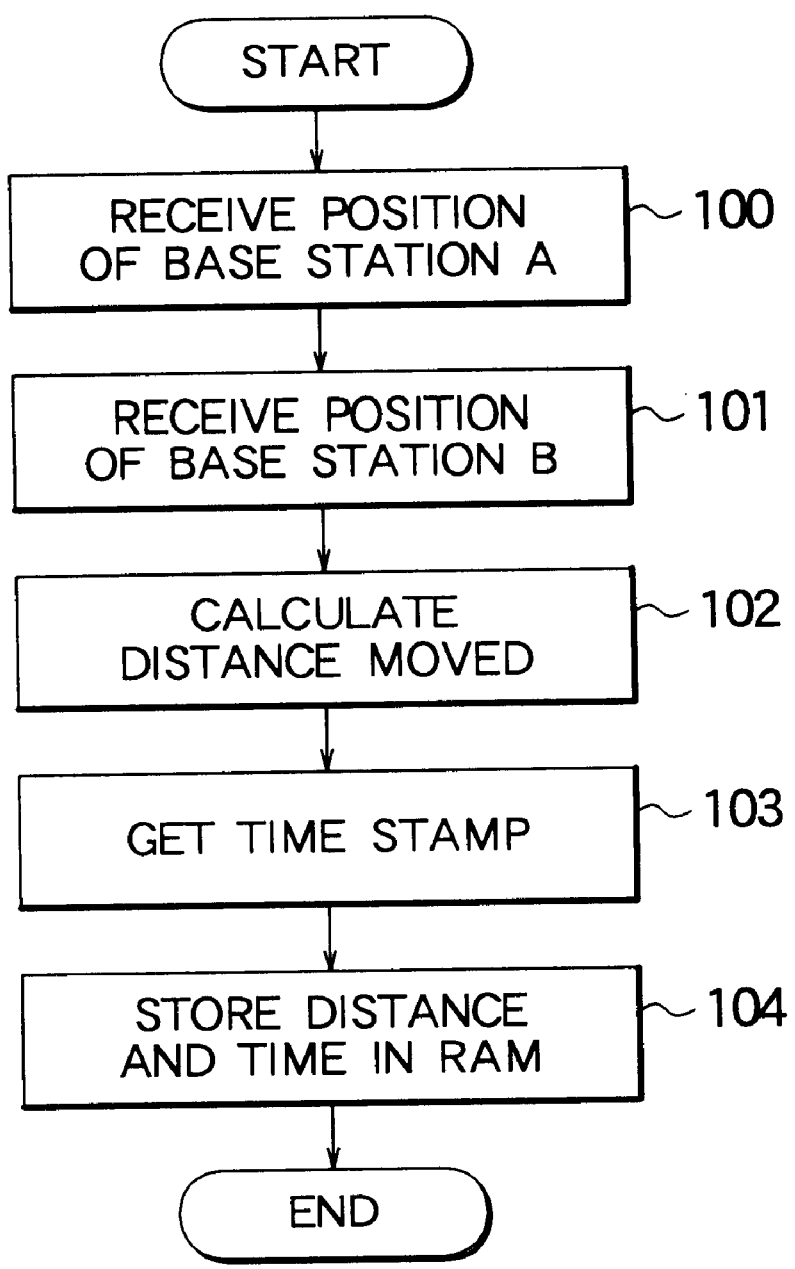
FIG. 5 is a flowchart illustrating the calculation of distance moved in the first embodiment.

FIG. 5 illustrates the distance-calculation procedure followed in step m, for the case in which the mobile terminal C has moved from the cell of base station A to the cell of base station B. During the registration procedure, mobile terminal C receives the latitude and longitude of base station A (step 100) and the latitude and longitude of base station B (step 101) as described above. These two steps (100 and 101) may be performed in either order. The distance moved (D) is calculated (step 102) from the following equation:

$$D=|(\Delta LAT^2+\Delta LONG^2)^{1/2}/\alpha|$$

where $\Delta LAT$ is the difference in latitude between base stations A and B, and $\Delta LONG$ is the difference in longitude between base stations A and B. The parameter $\alpha$ is a constant determined from, for example, the latitudes of the base stations and the relative strength with which their pilot signals are received at the mobile terminal.

Having calculated the distance moved, the mobile terminal obtains a time stamp giving the current time (step 103), and stores both the distance D and time stamp in the RAM 11.

Figure 6:
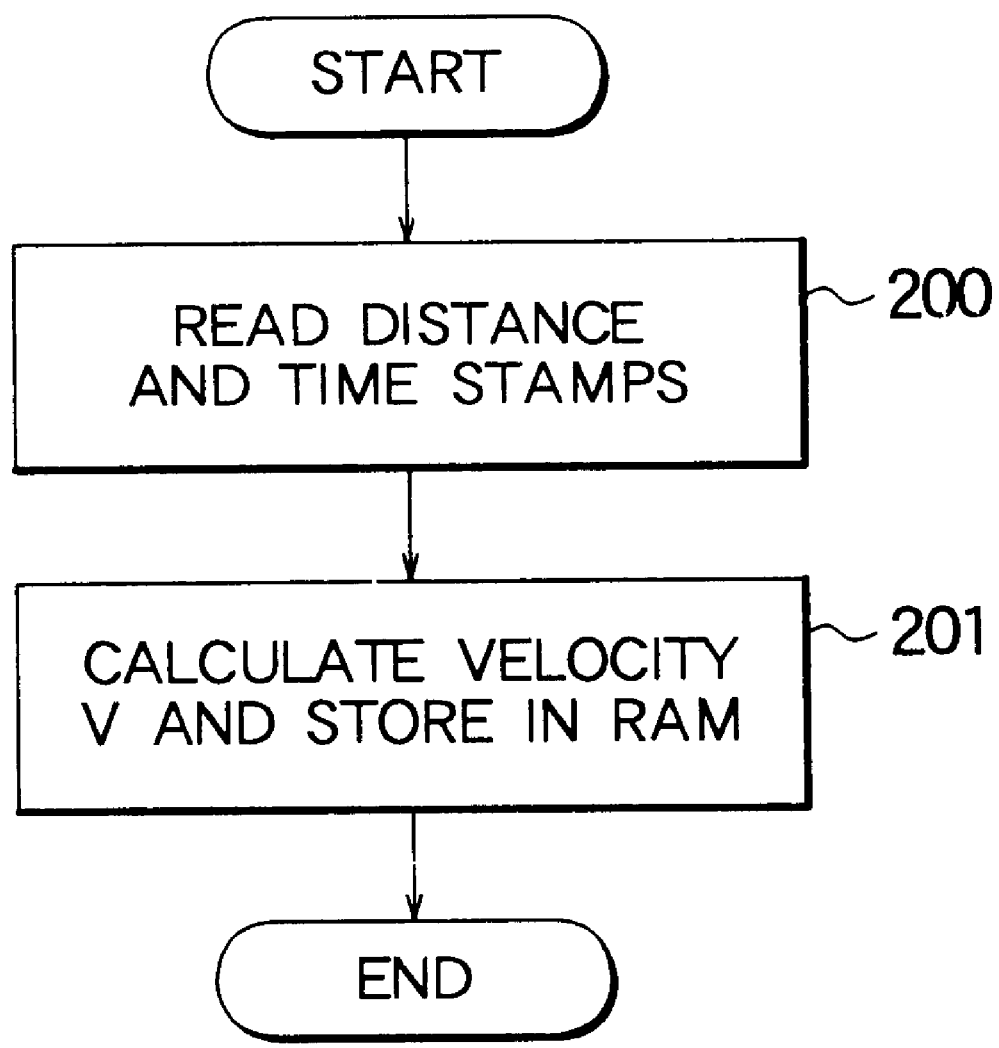
FIG. 6 is a flowchart illustrating the calculation of velocity in the first embodiment.

FIG. 6 illustrates the velocity-calculation procedure followed in step n. The distance moved (D) is read from the RAM 11, together with the time stamps recorded at the beginning and end of the period of motion (step 200). The velocity (V) is then calculated from the following equation:

$$V=|D/\Delta time|$$

where $\Delta time$ is the difference between the two time stamps. The calculated velocity is stored in the RAM 11.

Figure 7:
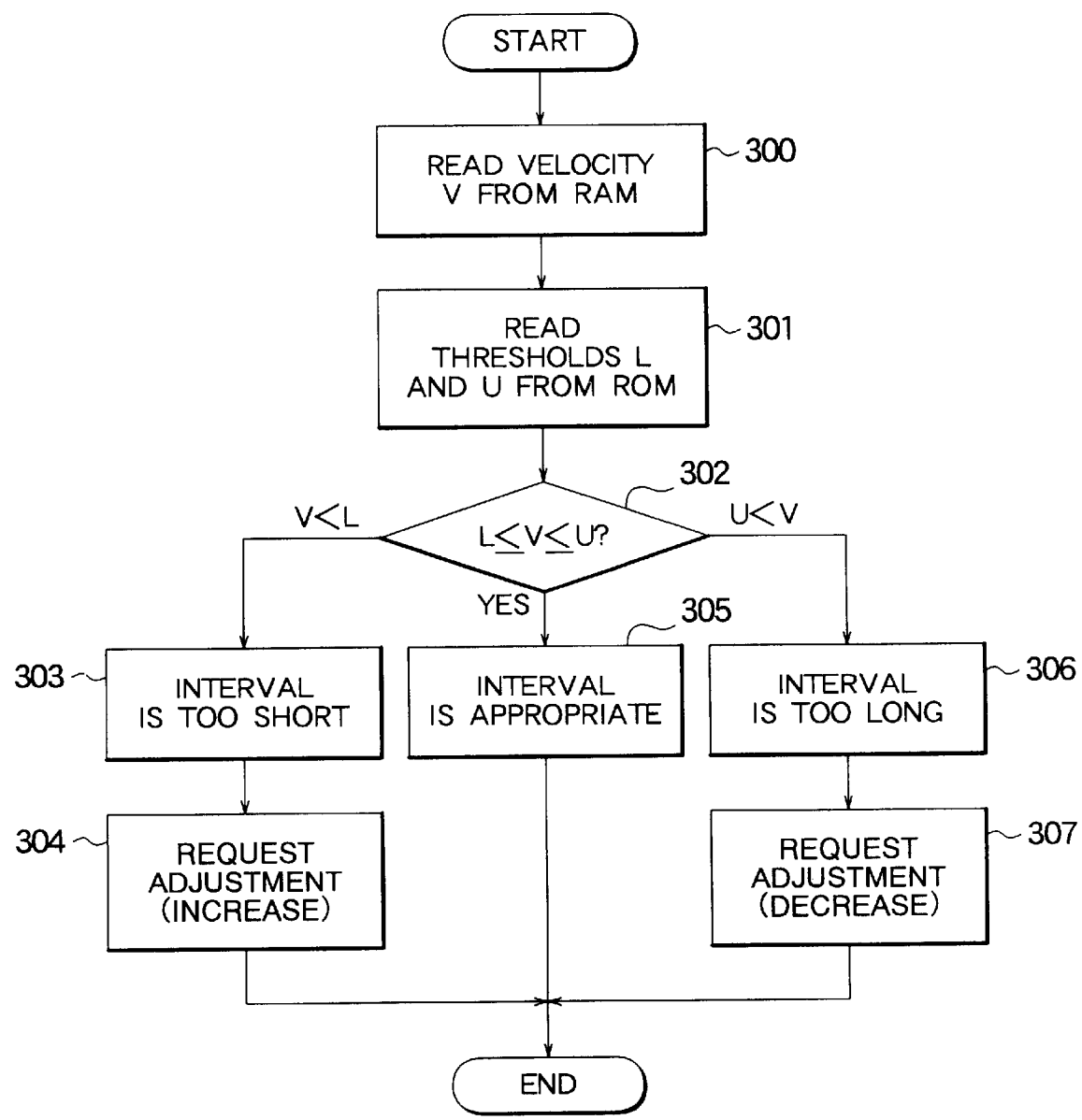
FIG. 7 is a flowchart illustrating the evaluation of the registration interval in the first embodiment.

FIG. 7 illustrates the evaluation performed in step o. The calculated velocity (V) is read from the RAM 11 (step 300), and a pair of thresholds (L and U) are read from the ROM 12 (step 301). These thresholds depend on the assigned registration interval, and are stored in a table in the ROM 12. The velocity (V) is compared with the thresholds (step 302). If the velocity (V) is less than the lower threshold (L), the mobile terminal determines that the registration interval is too short (step 303), and sends an adjustment request to the location registration apparatus, requesting that the registration interval be increased (step 304). If the velocity (V) is between the lower threshold (L) and upper threshold (U), the mobile terminal determines that the registration interval is appropriate (step 305). If the velocity (V) is greater than the upper threshold (U), the mobile terminal determines that the registration interval is too long (step 306), and sends an adjustment request to the location registration apparatus, requesting that the registration interval be decreased (step 307).

Figure 8:
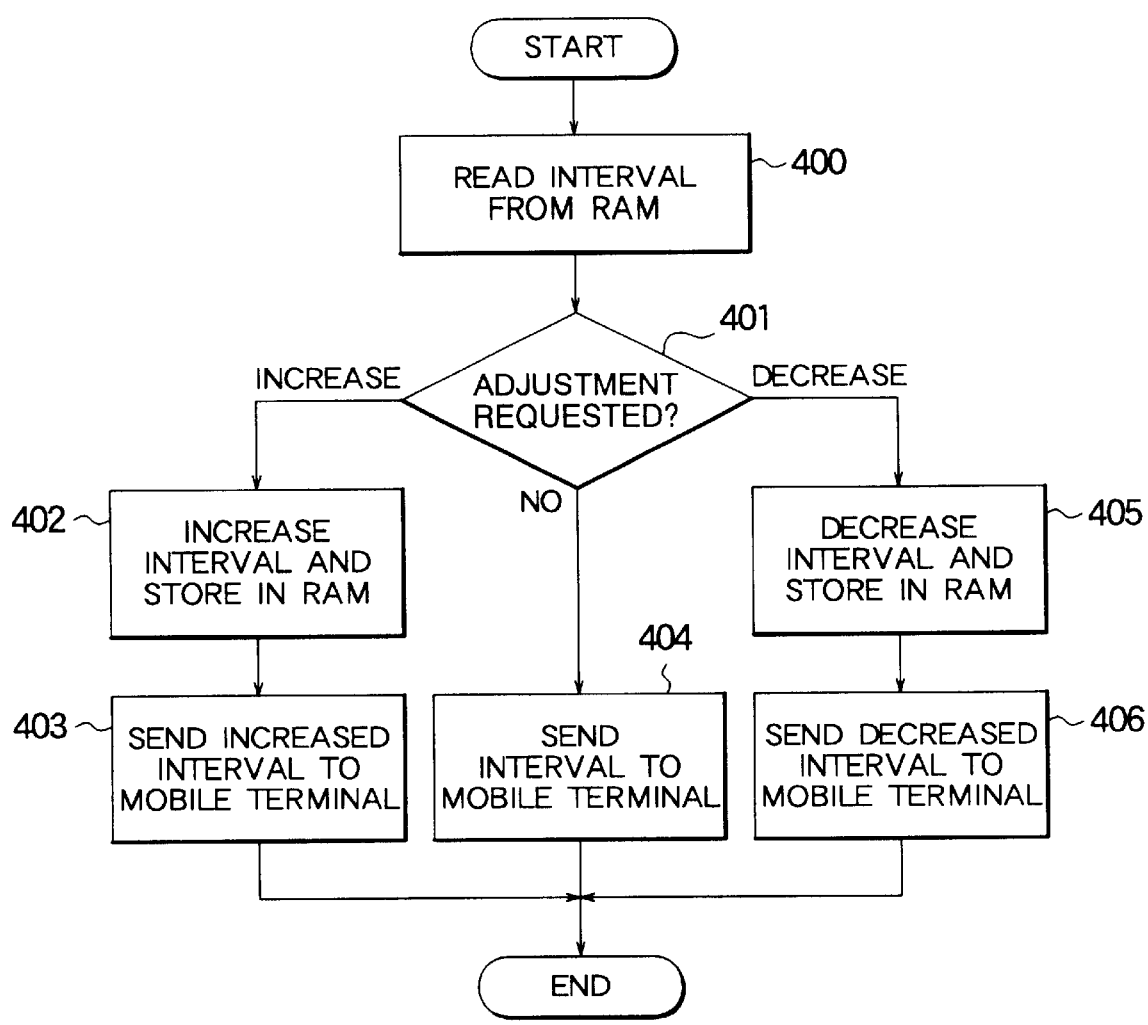
FIG. 8 is a flowchart illustrating the adjustment of the registration interval in the first embodiment.

FIG. 8 shows the procedure followed by the location registration apparatus in deciding the registration interval. The registration interval currently assigned to the mobile terminal is read from the RAM 17 (step 400), and the control unit 16 determines whether the mobile terminal has sent an adjustment request for this interval (step 401). If the mobile terminal has requested an increase, the control unit 16 increases the registration interval by a predetermined amount, stores the increased interval in the RAM 17 (step 402), and notifies the mobile terminal of the increased interval (step 403). If the mobile terminal has not requested an adjustment, the control unit 16 sends the currently assigned interval to the mobile terminal again (step 404). If the mobile terminal has requested a decrease, the control unit 16 decreases the registration interval by a predetermined amount, stores the decreased interval in the RAM 17 (step 405), and notifies the mobile terminal of the decreased interval (step 406).

The procedures shown in FIGS. 5 to 8 can be modified in various ways. For example, a mobile terminal can determine its position as a weighted average of the latitudes and longitudes of the surrounding base stations, and store the determined position together with a time stamp in the RAM 11. Velocity is then calculated as the distance between two such determined positions, divided by the difference between their time stamps.

The location registration apparatus can determine registration intervals on the basis of both system considerations such as processing loads, and adjustment requests made by mobile terminals.

Next, a second embodiment will be described. In the second embodiment, the mobile terminals adjust their own registration intervals.

Figure 9:
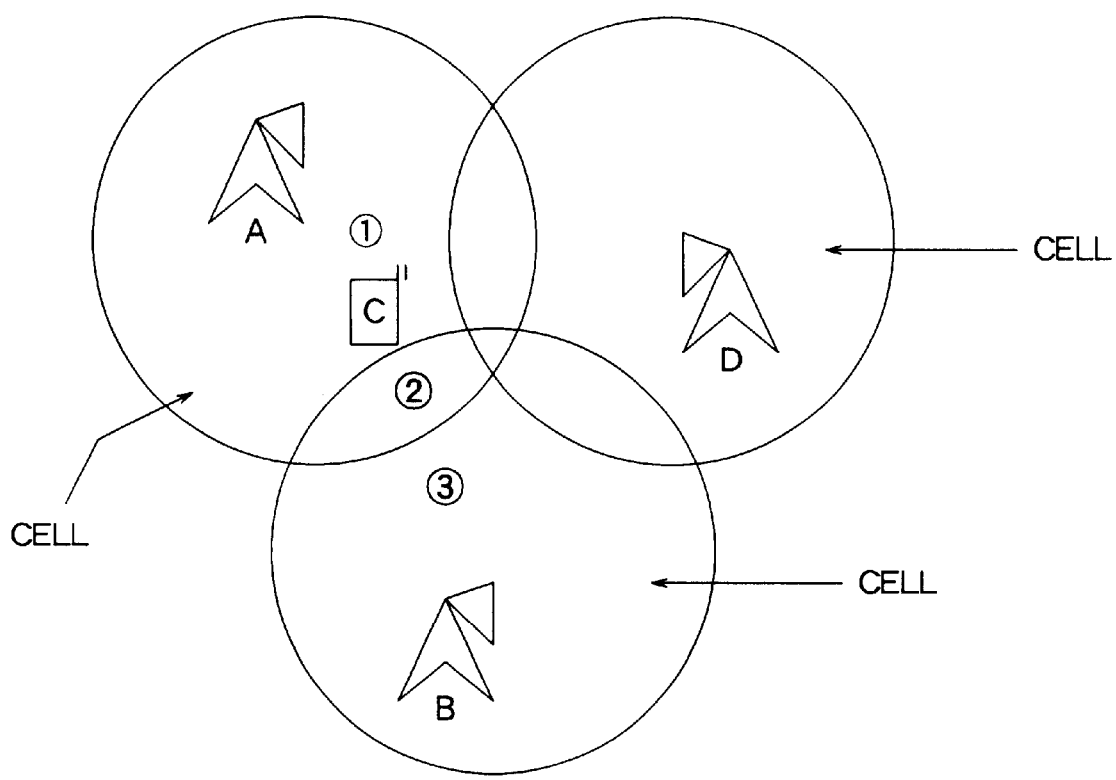
FIG. 9 is a cell map illustrating operations in a second embodiment of the invention.

Referring to FIG. 9, the base stations A, B, and D in the second embodiment serve cells with diameters of substantially ten kilometers (10 km).

A mobile terminal C is classified as moving at high speed if its velocity is at least fifty kilometers per hour (50 kph), at medium speed if its velocity is at least thirty kilometers per hour (30 kph) but less than fifty kilometers per hour, and at low speed if its velocity is at least ten kilometers per hour (10 kph) but less than thirty kilometers per hour. If the velocity is less than ten kilometers per hour, the mobile terminal is classified as stationary. The registration interval is one minute if the mobile terminal is moving at high speed, three minutes if at medium speed, five minutes if at low speed, and increases by stages, starting from ten minutes, if the mobile terminal is stationary. Mobile terminals determine their velocity from positional information (latitude and longitude) broadcast at intervals of, for example, one minute from the base stations. The mobile terminals receive all of these positional information broadcasts, and determine their velocities at intervals of one minute, using the equations given above.

The velocity ranges and intervals above are given only as one example. Many modifications are possible, provided the registration intervals satisfy system requirements.

If mobile terminal C is powered up while located at the position of the circled numeral '1' in FIG. 9, its velocity is initially unknown, but in response to its first registration message, it is assigned to base station A and given an initial registration interval of, for example, three minutes. One minute later, and again two minutes later, mobile terminal C re-determines its position from the positional information supplied by base station A. As long as the mobile terminal C remains near position (1), it receives positional information only from base station A, so the result of the distance and velocity calculations described above is that mobile terminal C considers itself to be stationary. In its next registration message, mobile terminal C notifies the system of its stationary condition, so that the location registration apparatus will not remove the registered location of mobile terminal C from the RAM 17 even if subsequent registration messages arrive only intermittently.

Next, mobile terminal C successively increases its own registration interval from three minutes to five minutes, then ten minutes, then twenty minutes, thereby conserving battery power. This state continues as long as the mobile terminal C remains idle, not originating or receiving a call, and remains in the area covered only by base station A.

While still idle, if mobile terminal C moves from position (1) to position (2), it begins to receive positional information from both base station A and base station B, and can determine a non-zero velocity. If the mobile terminal C now calculates that it is moving at a medium speed, for example, it registers its location by sending registration messages at intervals of three minutes. If the mobile terminal C calculates that it is moving at a high speed, it registers its location by sending registration messages at intervals of one minute. When mobile terminal C begins to receive the pilot signal of base station B more strongly than the pilot signal of base station A, the location registration apparatus reassigns mobile terminal C from base station A to base station B.

If the mobile terminal C moves from position (2) to position (3), where it is within range only of base station B, then the control unit 6 in mobile terminal C begins lengthening the registration interval again, to conserve battery power.

In the second embodiment, the location registration apparatus can be simplified because the mobile terminals assume responsibility for adjusting their own registration intervals, and the location registration apparatus does not have to make decisions about registration intervals. This arrangement has the further advantage of reducing the amount of overhead communication between the mobile terminals and base stations.

In a variation of the second embodiment, the mobile terminals determine their velocity from the Doppler shift of the carrier frequency of the pilot signals transmitted by the base stations.

Next, a third embodiment will be described. In the third embodiment, the system determines the velocity of a mobile terminal from the Doppler shift of the carrier frequency of the signal transmitted by the mobile terminal.

Figure 10:
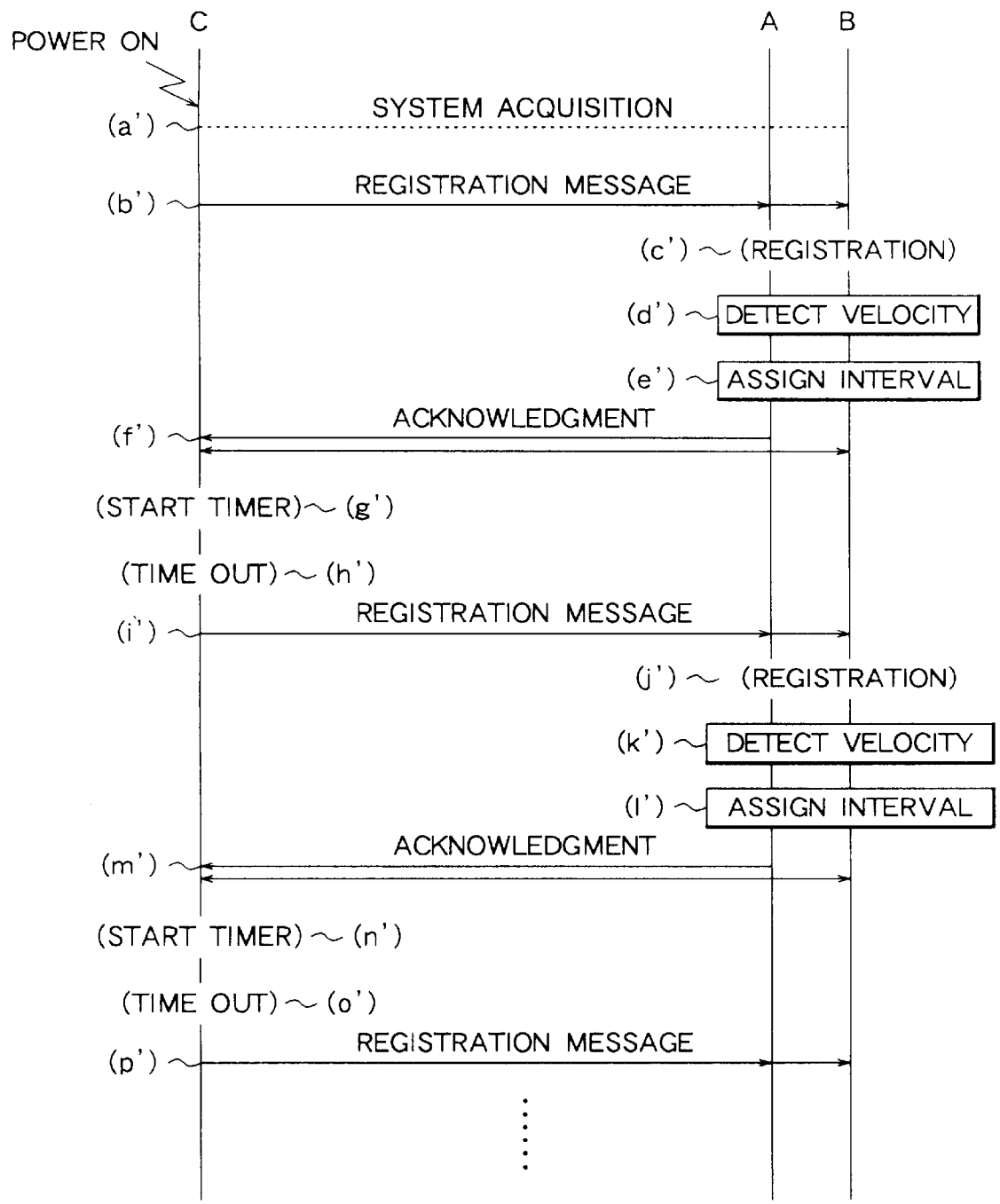
FIG. 10 is a sequence diagram illustrating the registration control procedure in a third embodiment of the invention.

Referring to FIG. 10, following system acquisition (step a'), mobile terminal C sends a power-up registration message (step b') to base station A or B. The position of the mobile terminal C is registered in the location registration apparatus as described in the first embodiment (step c'). In addition, the Doppler shift of the carrier frequency of the signal from mobile terminal C is detected at base station A or B, or at both base stations, and the velocity of mobile terminal C is thereby determined (step d'). The location registration apparatus assigns a registration interval to mobile terminal C on the basis of the velocity, or on the basis of the velocity and other considerations, such as system processing loads (step e'). Mobile terminal C is notified of the assigned interval in an acknowledgment message (step f'). The timer at mobile terminal C is set to the assigned interval and started (step g').

When the timer times out (step h'), mobile terminal C sends another registration message (step i'). The process of location registration (step J'), velocity determination (step k'), and interval assignment (step l') is carried out again, and another acknowledgment message is sent (step m'), notifying mobile terminal C of a new registration interval. Mobile terminal C uses its timer to measure this interval (steps n' and o'), then sends another registration message (step p').

Subsequent operations continue in this way. When the system detects that a mobile terminal is stationary, or moving at a low velocity, it lengthens the registration interval to reduce the load on system resources and conserve battery power at the mobile terminal. When the system detects that a mobile terminal is moving rapidly, it assigns a short registration interval, so that the mobile terminal's location can be kept accurately up to date.

In a variation of the third embodiment, the location registration apparatus determines the location of a mobile terminal from the pilot signal measurements provided in its registration messages, determines the change in location from one registration message to the next, and determines the velocity of the mobile terminal by dividing the registration interval into the change in location.

The invention has been described in relation to a CDMA wireless mobile communication system, but is also applicable to other types of mobile communication systems employing time-interval-based registration control.

The control processes and other processes described above can be carried out by either software or hardware.

A mobile terminal can sense its velocity by use of an accelerometer, or by various other means not described above, without having to determine its position.

Those skilled in the art will recognize that further variations are possible within the scope claimed below.

What is claimed is:

1. A method of registration control in a mobile communication system, comprising the steps of:
   (a) assigning a base station and a registration interval to a mobile terminal according to a system acquisition operation;
   (b) performing location registration at a timing determined from the registration interval;
   (c) calculating a velocity of the mobile terminal;
   (d) evaluating the assigned registration interval according to the calculated velocity, the step of evaluating comprising comparing the calculated velocity with a lower threshold and an upper threshold corresponding to the assigned registration level;
   (e) selecting and assigning a new registration interval corresponding to the calculated velocity if the assigned registration interval is inappropriate, comprising sub-steps of:
      increasing the assigned registration interval if the calculated velocity is less than the lower threshold; and
      decreasing the assigned registration interval if the calculated velocity is greater than the upper threshold; and
   (f) performing location registration at a timing determined from the new registration interval.

2. A method of registration control according to claim 1, wherein said step (c) is performed by said mobile terminal, using positional information provided by said base station.

3. A method of registration control according to claim 1, wherein said step (c) is performed by calculating said velocity from a Doppler frequency shift.

4. A method of registration control according to claim 1, wherein said step (c) and said step (d) are both performed by said mobile terminal.

5. The method of registration control according to claim 1, wherein said step (c) comprises steps of:
   obtaining a distance moved and associated time stamps demarcating the beginning and end of an interval over which the distance moved is measured; and
   calculating velocity based on the distance moved and the associated time stamps.

6. A mobile terminal for use in a mobile Communication system, comprising:
   means for performing location registration at a timing determined from an assigned registration interval;
   means for calculating a velocity of the mobile terminal;
   means for evaluating the registration interval according to the calculated velocity, said means for evaluating including means for comparing the calculated velocity with a lower threshold and an upper threshold corresponding to the assigned registration interval; and
   means for selecting and assigning a new registration interval corresponding to the calculated velocity if the registration interval is inappropriate, said means for selecting and assigning including means for increasing the assigned registration interval if the calculated velocity is less than the lower threshold and for decreasing the assigned registration interval if the calculated velocity is greater than the upper threshold.

7. The mobile terminal of claim 6, wherein said means for calculating a velocity comprises means for determining a distance moved and for determining an associated time stamp.

8. A location registration apparatus for registering locations of mobile terminals in a mobile communication system, comprising:
   means for assigning a registration interval to a mobile terminal;
   means for calculating a velocity of the mobile terminal;
   means for evaluating the assigned registration interval according to the calculated velocity, the means for evaluating the registration interval including means for comparing the calculated velocity with a lower threshold and an upper threshold corresponding to the assigned registration interval;

means for selecting and assigning to the mobile terminal a new registration interval corresponding to the calculated velocity if the assigned registration interval is inappropriate, the means for selecting and assigning including means for increasing the assigned registration interval if the calculated velocity is less than the lower threshold and for decreasing the assigned registration interval if the calculated velocity is greater than the upper threshold; and means for informing the mobile terminal of the new registration interval.

9. The location registration apparatus of claim 8, wherein said means for calculating a velocity comprises means for determining a distance moved and for determining an associated time stamp.

* * * * *